(12) United States Patent
Winter et al.

(10) Patent No.: US 11,998,010 B2
(45) Date of Patent: Jun. 4, 2024

(54) PESTICIDAL MIXTURES

(71) Applicant: BASF SE, Ludwigshafen (DE)

(72) Inventors: Christian Harald Winter, Ludwigshafen (DE); Jurith Montag, Limburgerhof (DE); Markus Gewehr, Limburgerhof (DE)

(73) Assignee: BASF SE, Ludwigshafen (DE)

(*) Notice: Subject to any disclaimer, the term of this patent is extended or adjusted under 35 U.S.C. 154(b) by 715 days.

(21) Appl. No.: 17/251,838

(22) PCT Filed: Jun. 25, 2019

(86) PCT No.: PCT/EP2019/066808
§ 371 (c)(1),
(2) Date: Dec. 14, 2020

(87) PCT Pub. No.: WO2020/007647
PCT Pub. Date: Jan. 9, 2020

(65) Prior Publication Data
US 2021/0251233 A1    Aug. 19, 2021

(30) Foreign Application Priority Data
Jul. 2, 2018 (EP) .................... 18181065

(51) Int. Cl.
*A01N 43/653* (2006.01)
*A01N 43/713* (2006.01)

(52) U.S. Cl.
CPC ......... *A01N 43/653* (2013.01); *A01N 43/713* (2013.01)

(58) Field of Classification Search
CPC ..................... A01N 43/653; A01N 43/713
See application file for complete search history.

(56) References Cited

FOREIGN PATENT DOCUMENTS

| | | |
|---|---|---|
| WO | WO-2013/162072 A1 | 10/2013 |
| WO | WO-2016/187201 A2 | 11/2016 |
| WO | WO-2018/098216 A1 | 5/2018 |
| WO | WO-2018/098218 A1 | 5/2018 |
| WO | WO-2018/098222 A1 | 5/2018 |
| WO | WO-2018/098224 A1 | 5/2018 |
| WO | WO-2018/098235 A1 | 5/2018 |
| WO | WO-2018/098236 A1 | 5/2018 |
| WO | WO-2018/098243 A1 | 5/2018 |
| WO | WO-2018/098245 A1 | 5/2018 |

OTHER PUBLICATIONS

Jeanmart, S., "Synthetic approaches to the 2015-2018 new agrochemicals." Bioorganic & Medicinal Chemistry 39 (2021) 116162:1-24.*
Soller, H., "Prediction of synergistic multi-compound mixtures-A generalized Colby approach." Crop Protection 42 (2012): 180-185.*
International Application No. PCT/EP2019/066808, International Search Report and Written Opinion, dated Aug. 5, 2019.
European Search Report for EP Patent Application No. 18181065.6, dated Aug. 28, 2018, 3 pages.

* cited by examiner

*Primary Examiner* — John M Mauro
(74) *Attorney, Agent, or Firm* — MARSHALL, GERSTEIN & BORUN LLP

(57) ABSTRACT

The present invention relates Fungicidal mixtures comprising, as active components, 1) 4-[[6-(2,4-difluorophenyl)-1,1-difluoro-2-hydroxy-3-(5-sulfanyl-1,2,4-triazol-1-yl)propyl]-3-pyridyl]oxy]benzonitrile as compound I and 2) 1-2-[[1-(4-chlorophenyflpyrazol-3-yl]oxymethyl]-3-methylphenyl]-4-methyl-tetrazol-5-one as compound II and methods to combat phytopathogenic fungi based on such mixtures.

12 Claims, No Drawings

PESTICIDAL MIXTURES

CROSS-REFERENCE TO RELATED APPLICATIONS

This is the U.S. national phase of International Application No. PCT/EP2019/066808, filed Jun. 25, 2019, which claims the benefit of European Patent Application No. 18181065.6, filed Jul. 2, 2018.

DESCRIPTION

The present invention relates to fungicidal mixtures comprising as active components, 4-[[6-[2-(2,4-difluorophenyl)-1,1-difluoro-2-hydroxy-3-(5-sulfanyl-1,2,4-triazol-1-yl)propyl]-3-pyridyl]oxy]benzonitrile as compound I and 1-[2-[[1-(4-chlorophenyl)pyrazol-3-yl]oxymethyl]-3-methyl-phenyl]-4-methyl-tetrazol-5-one as compound II.

Moreover, the invention relates to an use of the mixture for controlling phytopathogenic harmful fungi and to a method for controlling phytopathogenic pests, wherein the pest, their habitat, breeding grounds, their locus or the plants to be protected against pest attack, the soil or plant propagation material are treated with an effective amount of the mixture.

The term "plant propagation material" is to be understood to denote all the generative parts of the plant such as seeds and vegetative plant material such as cuttings and tubers (e.g. potatoes), which can be used for the multiplication of the plant. This includes seeds, roots, fruits, tubers, bulbs, rhizomes, shoots, sprouts and other parts of plants, including seedlings and young plants, which are to be transplanted after germination or after emergence from soil.

These young plants may also be protected before transplantation by a total or partial treatment by immersion or pouring. In a particular preferred embodiment, the term propagation material denotes seeds.

Compound I and analogues as well as their pesticidal action and methods for producing them and mixtures are known e.g. from WO 2016187201, WO2018098216, WO2018098243, WO2018098245.

Compounds II as well as their pesticidal action and methods for producing them are generally known (cf.:http://www.alanwood.net/pesticides/); these substances are commercially available.

The compounds described by IUPAC nomenclature, their preparation and their pesticidal activity are also known (WO 2013 162072).

One typical problem arising in the field of pest control lies in the need to reduce the dosage rates of the active ingredient in order to reduce or avoid unfavorable environmental or toxicological effects whilst still allowing effective pest control.

In regard to the present invention the term pests embrace harmful fungi and animal pests.

Another problem encountered concerns the need to have available pest control agents which are effective against a broad spectrum of harmful fungi and harmful animal pests.

There also exists the need for pest control agents that combine knock-down activity with prolonged control, that is, fast action with long lasting action.

Another difficulty in relation to the use of pesticides is that the repeated and exclusive application of an individual pesticidal compound leads in many cases to a rapid selection of pests, that means animal pests, and harmful fungi, which have developed natural or adapted resistance against the active compound in question. Therefore, there is a need for pest control agents that help prevent or overcome resistance.

Another problem underlying the present invention is the desire for compositions that improve plants, a process which is commonly and hereinafter referred to as "plant health".

The term plant health comprises various sorts of improvements of plants that are not connected to the control of pests. For example, advantageous properties that may be mentioned are improved crop characteristics including: emergence, crop yields, protein content, oil content, starch content, more developed root system (improved root growth), improved stress tolerance (e.g. against drought, heat, salt, UV, water, cold), reduced ethylene (reduced production and/or inhibition of reception), tillering increase, increase in plant height, bigger leaf blade, less dead basal leaves, stronger tillers, greener leaf color, pigment content, photosynthetic activity, less input needed (such as fertilizers or water), less seeds needed, more productive tillers, earlier flowering, early grain maturity, less plant verse (lodging), increased shoot growth, enhanced plant vigor, increased plant stand and early and better germination; or any other advantages familiar to a person skilled in the art.

It was therefore an object of the present invention to provide pesticidal mixtures which solve the problems of reducing the dosage rate and/or enhancing the spectrum of activity and/or combining knock-down activity with prolonged control and/or to resistance management and/or promoting the health of plants.

We have found that this object is in part or in whole achieved by the fungicidal mixtures comprising as active components comprising as active components, 4-[[6-[2-(2,4-difluorophenyl)-1,1-difluoro-2-hydroxy-3-(5-sulfanyl-1,2,4-triazol-1-yl)propyl]-3-pyridyl]oxy]benzonitrile as compound I and 1-[2-[[1-(4-chlorophenyl)pyrazol-3-yl]oxymethyl]-3-methyl-phenyl]-4-methyl-tetrazol-5-one as compound II.

Especially, it has been found that the mixtures as defined in the outset show markedly enhanced action against pests compared to the control rates that are possible with the individual compounds and/or is suitable for improving the health of plants when applied to plants, parts of plants, seeds, or at their locus of growth.

It has been found that the action of the inventive mixtures comprising compound I and compound II goes far beyond the fungicidal and/or plant health improving action of the active compounds present in the mixture alone (synergistic action).

Moreover, we have found that simultaneous, that is joint or separate, application of the compound I and the compound II or successive application of the compound I and the compound II allows enhanced control of harmful fungi, compared to the control rates that are possible with the individual compounds (synergistic mixtures).

Moreover, we have found that simultaneous, that is joint or separate, application of the compound I and the compound II or successive application of the compound I and the compound II provides enhanced plant health effects compared to the plant health effects that are possible with the individual compounds.

The ratio by weight of compound I and compound II in binary mixtures is from 10000:1 to 1:10000, from 500:1 to 1:500, preferably from 100:1 to 1:100 more preferably from 50:1 to 1:50, most preferably from 20:1 to 1:20, including also ratios from 10:1 to 1:10, 1:5 to 5:1, or 1:1.

All above-referred mixtures are herein below referred to as "inventive mixtures".

The inventive mixtures can further contain one or more insecticides, fungicides, herbicides.

The inventive mixtures can be converted into customary types of agrochemical compositions, e.g. solutions, emulsions, suspensions, dusts, powders, pastes, granules, pressings, capsules, and mixtures thereof. Examples for composition types are suspensions (e.g. SC, OD, FS), emulsifiable concentrates (e.g. EC), emulsions (e.g. EW, EO, ES, ME), capsules (e.g. CS, ZC), pastes, pastilles, wettable powders or dusts (e.g. WP, SP, WS, DP, DS), pressings (e.g. BR, TB, DT), granules (e.g. WG, SG, GR, FG, GG, MG), insecticidal articles (e.g. LN), as well as gel formulations for the treatment of plant propagation materials such as seeds (e.g. GF). These and further compositions types are defined in the "Catalogue of pesticide formulation types and international coding system", Technical Monograph No. 2, $6^{th}$ Ed. May 2008, CropLife International.

The compositions are prepared in a known manner, such as described by Mollet and Grubemann, Formulation technology, Wiley VCH, Weinheim, 2001; or Knowles, New developments in crop protection product formulation, Agrow Reports DS243, T&F Informa, London, 2005.

Suitable auxiliaries are solvents, liquid carriers, solid carriers or fillers, surfactants, dispersants, emulsifiers, wetters, adjuvants, solubilizers, penetration enhancers, protective colloids, adhesion agents, thickeners, humectants, repellents, attractants, feeding stimulants, compatibilizers, bactericides, anti-freezing agents, anti-foaming agents, colorants, tackifiers and binders.

Suitable solvents and liquid carriers are water and organic solvents, such as mineral oil fractions of medium to high boiling point, e.g. kerosene, diesel oil; oils of vegetable or animal origin; aliphatic, cyclic and aromatic hydrocarbons, e.g. toluene, paraffin, tetrahydronaphthalene, alkylated naphthalenes; alcohols, e.g. ethanol, propanol, butanol, benzylalcohol, cyclohexanol; glycols; DMSO; ketones, e.g. cyclohexanone; esters, e.g. lactates, carbonates, fatty acid esters, gamma-butyrolactone; fatty acids; phosphonates; amines; amides, e.g. N-methylpyrrolidone, fatty acid dimethylamides; and mixtures thereof.

Suitable solid carriers or fillers are mineral earths, e.g. silicates, silica gels, talc, kaolins, limestone, lime, chalk, clays, dolomite, diatomaceous earth, bentonite, calcium sulfate, magnesium sulfate, magnesium oxide; polysaccharides, e.g. cellulose, starch; fertilizers, e.g. ammonium sulfate, ammonium phosphate, ammonium nitrate, ureas; products of vegetable origin, e.g. cereal meal, tree bark meal, wood meal, nutshell meal, and mixtures thereof.

Suitable surfactants are surface-active compounds, such as anionic, cationic, nonionic and amphoteric surfactants, block polymers, polyelectrolytes, and mixtures thereof. Such surfactants can be used as emulsifier, dispersant, solubilizer, wetter, penetration enhancer, protective colloid, or adjuvant. Examples of surfactants are listed in McCutcheon's, Vol. 1: Emulsifiers & Detergents, McCutcheon's Directories, Glen Rock, USA, 2008 (International Ed. or North American Ed.)

Suitable anionic surfactants are alkali, alkaline earth or ammonium salts of sulfonates, sulfates, phosphates, carboxylates, and mixtures thereof. Examples of sulfonates are alkylarylsulfonates, diphenylsulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates.

Suitable nonionic surfactants are alkoxylates, N-substituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-substituted fatty acid amides are fatty acid glucamides or fatty acid alkanolamides.

Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are home- or copolymers of vinylpyrrolidone, vinylalcohols, or vinylacetate.

Suitable cationic surfactants are quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the A-B or A-B-A type comprising blocks of polyethylene oxide and polypropylene oxide, or of the A-B-C type comprising alkanol, polyethylene oxide and polypropylene oxide.

Suitable polyelectrolytes are polyacids or polybases. Examples of polyacids are alkali salts of polyacrylic acid or polyacid comb polymers. Examples of polybases are polyvinylamines or polyethyleneamines.

Suitable adjuvants are compounds, which have a neglectable or even no pesticidal activity themselves, and which improve the biological performance of the inventive mixtures on the target. Examples are surfactants, mineral or vegetable oils, and other auxilaries. Further examples are listed by Knowles, Adjuvants and additives, Agrow Reports DS256, T&F Informa UK, 2006, chapter 5.

Suitable thickeners are polysaccharides (e.g. xanthan gum, carboxymethylcellulose), inorganic clays (organically modified or unmodified), polycarboxylates, and silicates.

Suitable bactericides are bronopol and isothiazolinone derivatives such as alkylisothiazolinones and benzisothiazolinones.

Suitable anti-freezing agents are ethylene glycol, propylene glycol, urea and glycerin.

Suitable anti-foaming agents are silicones, long chain alcohols, and salts of fatty acids.

Suitable colorants (e.g. in red, blue, or green) are pigments of low water solubility and water-soluble dyes. Examples are inorganic colorants (e.g. iron oxide, titan oxide, iron hexacyanoferrate) and organic colorants (e.g. alizarin-, azo- and phthalocyanine colorants).

Suitable tackifiers or binders are polyvinylpyrrolidons, polyvinylacetates, polyvinyl alcohols, polyacrylates, biological or synthetic waxes, and cellulose ethers.

Examples for composition types and their preparation are:
i) Water-soluble concentrates (SL, LS)
    10-60 wt % of an inventive mixture and 5-15 wt % wetting agent (e.g. alcohol alkoxylates) are dissolved in water and/or in a water-soluble solvent (e.g. alcohols) ad 100 wt %. The active substance dissolves upon dilution with water.

ii) Dispersible concentrates (DC)

5-25 wt % of an inventive mixture and 1-10 wt % dispersant (e.g. polyvinylpyrrolidone) are dissolved in organic solvent (e.g. cyclohexanone) ad 100 wt %. Dilution with water gives a dispersion.

iii) Emulsifiable concentrates (EC)

15-70 wt % of an inventive mixture and 5-10 wt % emulsifiers (e.g. calcium dodecylbenzenesulfonate and castor oil ethoxylate) are dissolved in water-insoluble organic solvent (e.g. aromatic hydrocarbon) ad 100 wt %. Dilution with water gives an emulsion.

iv) Emulsions (EW, EO, ES)

5-40 wt % of an inventive mixture and 1-10 wt % emulsifiers (e.g. calcium dodecylbenzenesulfonate and castor oil ethoxylate) are dissolved in 20-40 wt % water-insoluble organic solvent (e.g. aromatic hydrocarbon). This mixture is introduced into water ad 100 wt % by means of an emulsifying machine and made into a homogeneous emulsion. Dilution with water gives an emulsion.

v) Suspensions (SC, OD, FS)

In an agitated ball mill, 20-60 wt % of an inventive mixture are comminuted with addition of 2-10 wt % dispersants and wetting agents (e.g. sodium lignosulfonate and alcohol ethoxylate), 0.1-2 wt % thickener (e.g. xanthan gum) and water ad 100 wt % to give a fine active substance suspension. Dilution with water gives a stable suspension of the active substance. For FS type composition up to 40 wt % binder (e.g. polyvinylalcohol) is added.

vi) Water-dispersible granules and water-soluble granules (WG, SG)

50-80 wt % of an inventive mixture are ground finely with addition of dispersants and wetting agents (e.g. sodium lignosulfonate and alcohol ethoxylate) ad 100 wt % and prepared as water-dispersible or water-soluble granules by means of technical appliances (e.g. extrusion, spray tower, fluidized bed). Dilution with water gives a stable dispersion or solution of the active substance.

vii) Water-dispersible powders and water-soluble powders (WP, SP, WS)

50-80 wt % of an inventive mixture are ground in a rotor-stator mill with addition of 1-5 wt % dispersants (e.g. sodium lignosulfonate), 1-3 wt % wetting agents (e.g. alcohol ethoxylate) and solid carrier (e.g. silica gel) ad 100 wt %. Dilution with water gives a stable dispersion or solution of the active substance.

viii) Gel (GW, GF)

In an agitated ball mill, 5-25 wt % of an inventive mixture are comminuted with addition of 3-10 wt % dispersants (e.g. sodium lignosulfonate), 1-5 wt % thickener (e.g. carboxymethylcellulose) and water ad 100 wt % to give a fine suspension of the active substance. Dilution with water gives a stable suspension of the active substance.

ix) Microemulsion (ME)

5-20 wt % of an inventive mixture are added to 5-30 wt % organic solvent blend (e.g. fatty acid dimethylamide and cyclohexanone), 10-25 wt % surfactant blend (e.g. alcohol ethoxylate and arylphenol ethoxylate), and water ad 100%. This mixture is stirred for 1 h to produce spontaneously a thermodynamicallystable microemulsion.

x) Microcapsules (CS)

An oil phase comprising 5-50 wt % of an inventive mixture, 0-40 wt % water insoluble organic solvent (e.g. aromatic hydrocarbon), 2-15 wt % acrylic monomers (e.g. methylmethacrylate, methacrylic acid and a di- or triacrylate) are dispersed into an aqueous solution of a protective colloid (e.g. polyvinyl alcohol). Radical polymerization initiated by a radical initiator results in the formation of poly(meth)acrylate microcapsules. Alternatively, an oil phase comprising 5-50 wt % of an inventive mixture according to the invention, 0-40 wt % water insoluble organic solvent (e.g. aromatic hydrocarbon), and an isocyanate monomer (e.g. diphenylmethene-4,4'-diisocyanatae) are dispersed into an aqueous solution of a protective colloid (e.g. polyvinyl alcohol). The addition of a polyamine (e.g. hexamethylenediamine) results in the formation of polyurea microcapsules. The monomers amount to 1-10 wt %. The wt % relate to the total CS composition.

xi) Dustable powders (DP, DS)

1-10 wt % of an inventive mixture are ground finely and mixed intimately with solid carrier (e.g. finely divided kaolin) ad 100 wt %.

xii) Granules (GR, FG)

0.5-30 wt % of an inventive mixture is ground finely and associated with solid carrier (e.g. silicate) ad 100 wt %. Granulation is achieved by extrusion, spray-drying or fluidized bed.

xiii) Ultra-low volume liquids (UL)

1-50 wt % of an inventive mixture are dissolved in organic solvent (e.g. aromatic hydrocarbon) ad 100 wt %.

The compositions types i) to xiii) may optionally comprise further auxiliaries, such as 0.1-1 wt % bactericides, 5-15 wt % anti-freezing agents, 0.1-1 wt % anti-foaming agents, and 0.1-1 wt % colorants.

The resulting agrochemical compositions generally comprise between 0.01 and 95%, preferably between 0.1 and 90%, and in particular between 0.5 and 75%, by weight of active substance. The active substances are employed in a purity of from 90% to 100%, preferably from 95% to 100% (according to NMR spectrum).

Solutions for seed treatment (LS), Suspoemulsions (SE), flowable concentrates (FS), powders for dry treatment (DS), water-dispersible powders for slurry treatment (WS), water-soluble powders (SS), emulsions (ES), emulsifiable concentrates (EC) and gels (GF) are usually employed for the purposes of treatment of plant propagation materials, particularly seeds. The compositions in question give, after two-to-tenfold dilution, active substance concentrations of from 0.01 to 60% by weight, preferably from 0.1 to 40%, in the ready-to-use preparations. Application can be carried out before or during sowing. Methods for applying the inventive mixtures and compositions thereof, respectively, on to plant propagation material, especially seeds include dressing, coating, pelleting, dusting, soaking and in-furrow application methods of the propagation material. Preferably, the inventive mixtures or the compositions thereof, respectively, are applied on to the plant propagation material by a method such that germination is not induced, e.g. by seed dressing, pelleting, coating and dusting.

When employed in plant protection, the amounts of active substances applied are, depending on the kind of effect desired, from 0.001 to 2 kg per ha, preferably from 0.005 to 2 kg per ha, more preferably from 0.01 to 1.0 kg per ha, and in particular from 0.05 to 0.75 kg per ha.

In treatment of plant propagation materials such as seeds, e.g. by dusting, coating or drenching seed, amounts of active substance of from 0.01-10 kg, preferably from 0.1-1000 g, more preferably from 1-100 g per 100 kilogram of plant propagation material (preferably seeds) are generally required.

When used in the protection of materials or stored products, the amount of active substance applied depends on the kind of application area and on the desired effect. Amounts customarily applied in the protection of materials are 0.001 g to 2 kg, preferably 0.005 g to 1 kg, of active substance per cubic meter of treated material.

Various types of oils, wetters, adjuvants, fertilizer, or micronutrients, and further pesticides (e.g. herbicides, insecticides, fungicides, growth regulators, safeners) may be added to the active substances or the compositions comprising them as premix or, if appropriate not until immediately prior to use (tank mix). These agents can be admixed with the compositions according to the invention in a weight ratio of 1:100 to 100:1, preferably 1:10 to 10:1.

The user applies the composition according to the invention usually from a predosage device, a knapsack sprayer, a spray tank, a spray plane, or an irrigation system. Usually, the agrochemical composition is made up with water, buffer, and/or further auxiliaries to the desired application concentration and the ready-to-use spray liquor or the agrochemical composition according to the invention is thus obtained. Usually, 20 to 2000 liters, preferably 50 to 400 liters, of the ready-to-use spray liquor are applied per hectare of agricultural useful area.

According to one embodiment, individual components of the composition according to the invention such as parts of a kit or parts of a binary mixture may be mixed by the user himself in a spray tank or any other kind of vessel used for applications (e.g. seed treater drums, seed pelleting machinery, knapsack sprayer) and further auxiliaries may be added, if appropriate.

Consequently, one embodiment of the invention is a kit for preparing a usable pesticidal composition, the kit comprising a) a composition comprising component 1) as defined herein and at least one auxiliary; and b) a composition comprising component 2) as defined herein and at least one auxiliary; and optionally c) a composition comprising at least one auxiliary and optionally a further active component 3) as defined herein.

As said above, the present invention comprises an use of the mixture for controlling phytopathogenic harmful fungi and to a method for controlling phytopathogenic pests, wherein the pest, their habitat, breeding grounds, their locus or the plants to be protected against pest attack, the soil or plant propagation material are treated with an effective amount of the mixture.

Advantageously, the inventive mixtures are suitable for controlling the following fungal plant diseases:

*Albugo* spp. (white rust) on ornamentals, vegetables (e.g. *A. candida*) and sunflowers (e.g. *A. tragopogonis*); *Alternaria* spp. (*Alternaria* leaf spot) on vegetables (e.g. *A. daud* or *A. porn*), oilseed rape (*A. brassicicola* or *brassicae*), sugar beets (*A. tenuis*), fruits (e.g. *A. grandis*), rice, soybeans, potatoes and tomatoes (e.g. *A. solani, A. grandis* or *A. alternata*), tomatoes (e.g. *A. solani* or *A. alternata*) and wheat (e.g. *A. triticina*); *Aphanomyces* spp. on sugar beets and vegetables; *Ascochyta* spp. on cereals and vegetables, e.g. *A. tritici* (anthracnose) on wheat and *A. hordei* on barley; *Aureobasidium zeae* (syn. *Kapatiella zeae*) on corn; *Bipolaris* and *Drechslera* spp. (teleomorph: *Cochliobolus* spp.), e.g. Southern leaf blight (*D. maydis*) or Northern leaf blight (*B. zeicola*) on corn, e.g. spot blotch (*B. sorokiniana*) on cereals and e.g. *B. oryzae* on rice and turfs; *Blumeria* (formerly *Erysiphe*) *graminis* (powdery mildew) on cereals (e.g. on wheat or barley); *Botrytis cinerea* (teleomorph: *Botryotinia fuckeliana*: grey mold) on fruits and berries (e.g. strawberries), vegetables (e.g. lettuce, carrots, celery and cabbages); *B. squamosa* or *B. allii* on onion family), oilseed rape, ornamentals (e.g. *B. eliptica*), vines, forestry plants and wheat; *Bremia lactucae* (downy mildew) on lettuce; *Ceratocystis* (syn. *Ophiostoma*) spp. (rot or wilt) on broad-leaved trees and evergreens, e.g. *C. ulmi* (Dutch elm disease) on elms; *Cercospora* spp. (*Cercospora* leaf spots) on corn (e.g. Gray leaf spot: *C. zeae-maydis*), rice, sugar beets (e.g. *C. beticola*), sugar cane, vegetables, coffee, soybeans (e.g. *C. sojina* or *C. kikuchii*) and rice; *Cladobotryum* (syn. *Dactylium*) spp. (e.g. *C. mycophllum* (formerly *Dactylium dendroides*, teleomorph: *Nectria albertinii, Nectria rosella* syn. *Hypomyces rosellus*) on mushrooms; *Cladosporium* spp. on tomatoes (e.g. *C. fulvum* leaf mold) and cereals, e.g. *C. herbarum* (black ear) on wheat; *Claviceps purpurea* (ergot) on cereals; *Cochliobolus Helminthosporium* of *Bipolaris*) spp. (leaf spots) on corn (*C. carbonum*), cereals (e.g. *C. sativus*, anamorph: *B. sorokiniana*) and rice (e.g. *C. miyabeanus*, anamorph: *H. oryzae*); *Colletotrichum* (teleomorph: *Glomerella*) spp. (anthracnose) on cotton (e.g. *C. gossypii*), corn (e.g. *C. graminicola*: Anthracnose stalk rot), soft fruits, potatoes (e.g. *C. coccodes*: black dot), beans (e.g. *C. lindemuthianum*), soybeans (e.g. *C. truncatum* or *C. gloeosporioides*), vegetables (e.g. *C. lagenarium* or *C. capsici*), fruits (e.g. *C. acutatum*), coffee (e.g. *C. coffeanum* or *C. kahawae*) and *C. gloeosporioides* on various crops; *Corticium* spp., e.g. *C. sasakii* (sheath blight) on rice; *Corynespora cassiicola* (leaf spots) on soybeans and ornamentals; *Cycloconium* spp., e.g. *C. oleaginum* on olive trees; *Cylindrocarpon* spp. (e.g. fruit tree canker or young vine decline, teleomorph: *Nectria* or *Neonectria* spp.) on fruit trees, vines (e.g. *C. liriodendri*, teleomorph: *Neonectria liriodendri*: Black Foot Disease) and ornamentals; *Dematophora* (teleomorph: *Rosellinia*) *necatrix* (root and stem rot) on soybeans; *Diaporthe* spp., e.g. *D. phaseolorum* (damping off) on soybeans; *Drechslera* (syn. *Helminthosporium*, teleomorph: *Pyrenophora*) spp. on corn, cereals, such as barley (e.g. *D. teres*, net blotch) and wheat (e.g. *D. tritici-repentis*: tan spot), rice and turf; Esca (dieback, apoplexy) on vines, caused by Formitiporia (syn. *Phellinus*) *punctata, F. mediterranea, Phaeomoniella chlamydospora* (formerly *Phaeoacremonium chlamydosporum*), *Phaeoacremonium aleophllum* and/or *Botryosphaeria obtuse; Elsinoe* spp. on pome fruits (*E. pyri*), soft fruits (*E. veneta*: anthracnose) and vines (*E. ampelina*: anthracnose); *Entyloma oryzae* (leaf smut) on rice; *Epicoccum* spp. (black mold) on wheat; *Erysiphe* spp. (powdery mildew) on sugar beets (*E. betae*), vegetables (e.g. *E. pisi*), such as cucurbits (e.g. *E. cichoracearum*), cabbages, oilseed rape (e.g. *E. cruciferarum*); *Eutypa lata* (*Eutypa* canker or dieback, anamorph: *Cytosporina lata*, syn. *Libertella blepharis*) on fruit trees, vines and ornamental woods; *Exserohilium* (syn. *Helminthosporium*) spp. on corn (e.g. *E. turcicum*); *Fusarium* (teleomorph: *Gibberella*) spp. (wilt, root or stem rot) on various plants, such as *F. graminearum* or *F. culmorum* (root rot, scab or head blight) on cereals (e.g. wheat or barley), *F. oxysporum* on tomatoes, *F. solani* (f. sp. *glycines* now syn. *F. virguliforme*) and *F. tucumaniae* and *F. brasiliense* each causing sudden death syndrome on soybeans, and *F. verticilliodies* on corn; *Gaeumannomyces graminis* (take-all) on cereals (e.g. wheat or barley) and corn;

*Gibberella* spp. on cereals (e.g. *G. zeae*) and rice (e.g. *G. fujikuroi*: Bakanae disease); *Glomerella cingulata* on vines, pome fruits and other plants and *G. gossypii* on cotton; Grainstaining complex on rice; *Guignardia bidwellii* (black rot) on vines; *Gymnosporangium* spp. on rosaceous plants and junipers, e.g. *G. sabinae* (rust) on pears; *Helminthosporium* spp. (syn. *Drechslera*, teleomorph: *Cochliobolus*) on corn, cereals, potatoes and rice; *Hemlleia* spp., e.g. *H. vastatrix* (coffee leaf rust) on coffee; *Isariopsis clavispora* (syn. *Cladosporium vitis*) on vines; *Macrophomina phaseolina* (syn. *phaseoli*) (root and stem rot) on soybeans and cotton; *Microdochium* (syn. *Fusarium*) *nivale* (pink snow mold) on cereals (e.g. wheat or barley); *Microsphaera diffusa* (powdery mildew) on soybeans; *Monilinia* spp., e.g. *M. laxa*, *M. fructicola* and *M. fructigena* (syn. *Monilia* spp.: bloom and twig blight, brown rot) on stone fruits and other rosaceous plants; *Mycosphaerella* spp. on cereals, bananas, soft fruits and ground nuts, such as e.g. *M. graminicola* (anamorph: *Zymoseptoria tritici* formerly *Septoria tritici*: *Septoria* blotch) on wheat or *M. fijiensis* (syn. *Pseudocercospora fijiensis*: black Sigatoka disease) and *M. musicola* on bananas, *M. arachidicola* (syn. *M. arachidis* or *Cercospora arachidis*), *M. berkeleyi* on peanuts, *M. pisi* on peas and *M. brassiciola* on brassicas; *Peronospora* spp. (downy mildew) on cabbage (e.g. *P. brassicae*), oilseed rape (e.g. *P. parasitica*), onions (e.g. *P. destructor*), tobacco (*P. tabacina*) and soybeans (e.g. *P. manshurica*); *Phakopsora pachyrhizi* and *P. meibomiae* (soybean rust) on soybeans; *Phialophora* spp. e.g. on vines (e.g. *P. tracheiphila* and *P. tetraspora*) and soybeans (e.g. *P. gregata*: stem rot); *Phoma lingam* (syn. *Leptosphaeria biglobosa* and *L. maculans*: root and stem rot) on oilseed rape and cabbage, *P. betae* (root rot, leaf spot and damping-off) on sugar beets and *P. zeae-maydis* (syn. *Phyllostica zeae*) on corn; *Phomopsis* spp. on sunflowers, vines (e.g. *P. viticola*: can and leaf spot) and soybeans (e.g. stem rot: *P. phaseoli*, teleomorph: *Diaporthe phaseolorum*); *Physoderma maydis* (brown spots) on corn; *Phytophthora* spp. (wilt, root, leaf, fruit and stem root) on various plants, such as paprika and cucurbits (e.g. *P. capsici*), soybeans (e.g. *P. megasperma*, syn. *P. sojae*), potatoes and tomatoes (e.g. *P. infestans*: late blight) and broad-leaved trees (e.g. *P. ramorum*: sudden oak death); *Plasmodiophora brassicae* (club root) on cabbage, oilseed rape, radish and other plants; *Plasmopara* spp., e.g. *P. viticola* (grapevine downy mildew) on vines and *P. halstedii* on sunflowers; *Podosphaera* spp. (powdery mildew) on rosaceous plants, hop, pome and soft fruits (e.g. *P. leucotricha* on apples) and curcurbits (*P. xanthii*); *Polymyxa* spp., e.g. on cereals, such as barley and wheat (*P. graminis*) and sugar beets (*P. betae*) and thereby transmitted viral diseases; *Pseudocercosporella herpotrichoides* (syn. *Oculimacula yallundae*, *O. acuformis*: eyespot, teleomorph: *Tapesia yallundae*) on cereals, e.g. wheat or barley; *Pseudoperonospora* (downy mildew) on various plants, e.g. *P. cubensis* on cucurbits or *P. humili* on hop; *Pseudopezicula tracheiphlla* (red fire disease or 'rotbrenner', anamorph: *Phialophora*) on vines; *Puccinia* spp. (rusts) on various plants, e.g. *P. triticina* (brown or leaf rust), *P. striiformis* (stripe or yellow rust), *P. hordei* (dwarf rust), *P. graminis* (stem or black rust) or *P. recondita* (brown or leaf rust) on cereals, such as e.g. wheat, barley or rye, *P. kuehnii* (orange rust) on sugar cane and *P. asparagi* on asparagus; *Pyrenopeziza* spp., e.g. *P. brassicae* on oilseed rape; *Pyrenophora* (anamorph: *Drechslera*) *tritici-repentis* (tan spot) on wheat or *P. teres* (net blotch) on barley; *Pyricularia* spp., e.g. *P. oryzae* (teleomorph: *Magnaporthe grisea*: rice blast) on rice and *P. grisea* on turf and cereals; *Pythium* spp. (damping-off) on turf, rice, corn, wheat, cotton, oilseed rape, sunflowers, soybeans, sugar beets, vegetables and various other plants (e.g. *P. ultimum* or *P. aphanidermatum*) and *P. oligandrum* on mushrooms; *Ramularia* spp., e.g. *R. collo-cygni* (*Ramularia* leaf spots, Physiological leaf spots) on barley and *R. beticola* on sugar beets; *Rhizoctonia* spp. on cotton, rice, potatoes, turf, corn, oilseed rape, potatoes, sugar beets, vegetables and various other plants, e.g. *R. solani* (root and stem rot) on soybeans, *R. solani* (sheath blight) on rice or *R. cerealis* (*Rhizoctonia* spring blight) on wheat or barley; *Rhizopus stolonifer* (black mold, soft rot) on strawberries, carrots, cabbage, vines and tomatoes; *Rhynchosporium secalis* and *R. commune* (scald) on barley, rye and triticale; *Sarocladium oryzae* and *S. attenuatum* (sheath rot) on rice; *Sclerotinia* spp. (stem rot or white mold) on vegetables (*S. minor* and *S. sclerotiorum*) and field crops, such as oilseed rape, sunflowers (e.g. *S. sclerotiorum*) and soybeans, *S. rolfsii* (syn. *Athelia rolfsii*) on soybeans, peanut, vegetables, corn, cereals and ornamentals; *Septoria* spp. on various plants, e.g. *S. glycines* (brown spot) on soybeans, *S. tritici* (syn. *Zymoseptoria tritici*, *Septoria* blotch) on wheat and *S.* (syn. *Stagonospora*) *nodorum* (*Stagonospora* blotch) on cereals; *Uncinula* (syn. *Erysiphe*) *necator* (powdery mildew, anamorph: *Oidium tuckeri*) on vines; *Setosphaeria* spp. (leaf blight) on corn (e.g. *S. turcicum*, syn. *Helminthosporium turcicum*) and turf; *Sphacelotheca* spp. (smut) on corn, (e.g. *S. reiliana*, syn. *Ustilago reiliana*: head smut), sorghum and sugar cane; *Sphaerotheca fuliginea* (syn. *Podosphaera xanthii* powdery mildew) on cucurbits; *Spongospora subterranea* (powdery scab) on potatoes and thereby transmitted viral diseases; *Stagonospora* spp. on cereals, e.g. *S. nodorum* (*Stagonospora* blotch, teleomorph: *Leptosphaeria* [syn. *Phaeosphaeria*] *nodorum*, syn. *Septoria nodorum*) on wheat; *Synchytrium endobioticum* on potatoes (potato wart disease); *Taphrina* spp., e.g. *T. deformans* (leaf curl disease) on peaches and *T. pruni* (plum pocket) on plums; *Thielaviopsis* spp. (black root rot) on tobacco, pome fruits, vegetables, soybeans and cotton, e.g. *T. basicola* (syn. *Chalara elegans*); *Tilletia* spp. (common bunt or stinking smut) on cereals, such as e.g. *T. tritici* (syn. *T. caries*, wheat bunt) and *T. controversa* (dwarf bunt) on wheat; *Trichoderma harzianum* on mushrooms, *Typhula incarnata* (grey snow mold) on barley or wheat; *Urocystis* spp., e.g. *U. occulta* (stem smut) on rye; *Uromyces* spp. (rust) on vegetables, such as beans (e.g. *U. appendiculatus*, syn. *U. phaseoli*), sugar beets (e.g. *U. betae* or *U. beticola*) and on pulses (e.g. *U. vignae*, *U. pisi*, *U. viciae-fabae* and U *fabae*); *Ustilago* spp. (loose smut) on cereals (e.g. *U. nuda* and *U. avaenae*), corn (e.g. *U. maydis* corn smut) and sugar cane; *Venturia* spp. (scab) on apples (e.g. *V. inaequalis*) and pears; and *Verticillium* spp. (wilt) on various plants, such as fruits and ornamentals, vines, soft fruits, vegetables and field crops, e.g. *V. longisporum* on oilseed rape, *V. dahliae* on strawberries, oilseed rape, potatoes and tomatoes, and *V. fungicola* on mushrooms; *Zymoseptoria tritici* on cereals; *Phaeosphaena maydis* and *Puccinia polysora*.

Mixtures according to the invention are suitable for combating phytopathogenic fungi, for example on cereals, such fungi containing a mutation in the mitochondrial cytochrome b gene conferring resistance to $Q_o$ inhibitors, wherein the mutation is G143A or F129L.

The term "cereals" comprises wheat or barley.

These fungi on wheat or barley containing a mutation in the mitochondrial cytochrome b gene conferring resistance to $Q_o$ inhibitors, wherein the mutation is G143A or F129L, are hereinafter referred to as "resistant fungi".

Resistant fungi on wheat or barley in the course of the use of the present invention, wherein the mutation is G143A are

*Septoria tritici*, (leaf blotch) on wheat,

*Microduchium nivale*, (head blight) on wheat,

*Blumeria graminis* f sp. *tritici*, (powdery mildew) on wheat,

*Phaesphaeria nodorum*, (leaf blotch) on wheat,

*Pyrenophora tritici-repentis*, (tan spot) on wheat,

*Rhynchosporium secalis*, (leaf blotch) on barley,

*Blumeria graminis* f sp. *hordei*, (powdery mildew) on barley and

*Ramularia collo-cygni*, (leaf spot) on barley.

The resistant fungi on wheat or barley in the course of the use of the present invention, wherein the mutation is F129L is *Pyrenophora teres*, (net blotch) on barley, *Puccinia recondite* (brown or leaf rust) on wheat or barley,

*Puccinia striiformis* (stripe or yellow rust) on wheat or barley,

In soybean, the following pathogens show increasing resistance towards $Q_o$ inhibitors due to their G143A mutation:

*Cercospora sojina* (frogeye leaf spot) and *Corynespora cassiicola* (target spot).

Thus, the present invention relates to the use of compound I for combating resistant fungi on cereals, wherein the cereal is wheat, and the resistant fungi is *Septoria tritici*.

Thus, the present invention relates to the use of compound I for combating resistant fungi on cereals, wherein the cereal is wheat, and the resistant fungi is *Microduchium nivale*.

Thus, the present invention relates to the use of compound I for combating resistant fungi on cereals, wherein the cereal is wheat, and the resistant fungi is *Blumeria graminis* f sp. *tritici*

Thus, the present invention relates to the use of compound I for combating resistant fungi on cereals, wherein the cereal is wheat, and the resistant fungi is *Phaesphaeria nodorum*.

Thus, the present invention relates to the use of compound I for combating resistant fungi on cereals, wherein the cereal is wheat, and the resistant fungi is *Pyrenophora tritici-repentis*.

Thus, the present invention relates to the use of compound I for combating resistant fungi on cereals, wherein the cereal is barely, and the resistant fungi is *Rhynchosporium secalis*.

Thus, the present invention relates to the use of compound I for combating resistant fungi on cereals, wherein the cereal is barely, and the resistant fungi is *Blumeria graminis* f sp. *hordei*.

Thus, the present invention relates to the use of compound I for combating resistant fungi on cereals, wherein the cereal is barely, and the resistant fungi is *Pyrenophora teres*.

Thus, the present invention relates to the use of compound I for combating resistant fungi on cereals, wherein the cereal is barely, and the resistant fungi is *Ramularia collo-cygni*.

The term "fruits" comprises apples or grapes.

The fungi on apples or grapes containing a G143A mutation in the mitochondrial cytochrome b gene conferring resistance to $Q_o$ inhibitors are hereinafter referred to as "resistant fungi".

Resistant fungi on apples or grapes in the course of the use of the present invention are

*Venturia inaequalis* (scab) on apple,

*Uncinula necator* (powdery mildew) on grapes and

*Plasmopara viticola* (downy mildew) on grapes.

Resistant fungi in the course of the use of the present invention, wherein the mutation is G143A are

*Pyricularia oryzae* (blast) on rice,

*Ustilago maydis* (smut) on maize,

*Ascochyta rabiei* (*ascochyta* blight) on chickpea,

*Didymella rabiei*(*ascochyta* blight) on chickpea,

*Cercospora beticola* (leaf spot) on sugar beets,

*Corynespora cassiicola* (target spot) on cucumber,

*Didymella bryoniae* (gummy stem blight) on cucurbits,

*Didymella bryoniae* (gummy stem blight) on watermelon,

*Podosphera fusca* (powdery mildew) on cucumber,

*Podosphera xenthii* (powdery mildew) on cucurbits,

*Pseudoperenospora cubensis* (downy mildew) on cucurbits,

*Sphaerotheca fuliginea* (powdery mildew) on cucumber,

*Alternaria alternata* (leaf spot) on potato,

*Mycovellosiealla nattrassii* (leaf mold) on Eggplant,

*Stemphylium vesicarium* (purple spot) on asparagus,

*Alternaria alternata* (*Alternaria* blotch) on apple,

*Alternaria malus* (*Alternaria* blotch) on apple,

*Alternaria alternata* (*Alternaria* brown spot) on citrus,

*Alternaria arborescens* (Alternria Late blight) on pistachio,

*Alternaria alternata* (Alternria Late blight) on pistachio,

*Alternaria tenuissima* (Alternria Late blight) on pistachio,

*Botrytis cinerea* (grey mold) on citrus,

*Botrytis cinerea* (grey mold) on kiwi,

*Botrytis cinerea* (grey mold) on strawberry,

*Colletotrichum gloeosporioides* (anthracnose) on strawberry,

*Sphaerotheca aphanis* var. *aphanis* (powdery mildew) on strawberry,

*Fusicladium carpophilum* (leaf spot) on almond,

*Mycosphaerella fifiensis* (black sigatoka) on banana,

*Stemphylium vesicarium* (brown spot) on pears,

*Colletotrichum graminicola* (leaf Spot) on grass, and

*Pyricularia grisea* (gray leafspot) on grass; and

*Monilinia taxa* (brown rot) on fruits (including, but not limited to as apple, citrus, kiwi, strawberry, watermelon, banana and pears);

*Monilinia fructigena* (brown rot) on fruits (including, but not limited to as apple, citrus, kiwi, strawberry, watermelon, banana and pears); and

*Monilinia fifiensis* (brown rot) on fruits (including, but not limited to as apple, citrus, kiwi, strawberry, watermelon, banana and pears).

The resistant fungi in the course of the use of the present invention, wherein the mutation is F129L is *Rhizoctonia solani* (sheet blight) on rice and *Alternaria solani* (leaf spot) on potato.

Thus, the present invention relates to the use of the mixture for combating resistant fungi on agricultural plants, wherein the plant is rice and the resistant fungi is *Pyricularia oryzae*.

Thus, the present invention relates to the use of the mixture for combating resistant fungi on agricultural plants, wherein the plant is rice and the resistant fungi is *Rhizoctonia solani*.

Thus, the present invention relates to the use of the mixture for combating resistant fungi on agricultural plants, wherein the plant is maize and the resistant fungi is *Ustilago maydis*.

Thus, the present invention relates to the use of the mixture for combating resistant fungi on agricultural plants, wherein the plant is chickpea and the resistant fungi is *Ascochyta rabiei*.

Thus, the present invention relates to the use of the mixture for combating resistant fungi on agricultural plants, wherein the plant is chickpea and the resistant fungi is *Didymella rabiei*.

Thus, the present invention relates to the use of the mixture for combating resistant fungi on agricultural plants, wherein the plant is sugar beets and the resistant fungi is *Cercospora beticola*.

Thus, the present invention relates to the use of the mixture for combating resistant fungi on agricultural plants, wherein the plant is cucumber and the resistant fungi is *Corynespora cassiicola*.

Thus, the present invention relates to the use of the mixture for combating resistant fungi on agricultural plants, wherein the plant is cucurbits and the resistant fungi is *Didymella bryoniae*.

Thus, the present invention relates to the use of the mixture for combating resistant fungi on agricultural plants, wherein the plant is watermelon and the resistant fungi is *Didymella bryoniae*.

Thus, the present invention relates to the use of the mixture for combating resistant fungi on agricultural plants, wherein the plant is cucumber and the resistant fungi is *Podosphera fusca*.

Thus, the present invention relates to the use of the mixture for combating resistant fungi on agricultural plants, wherein the plant is cucurbits and the resistant fungi is *Podosphera xenthii*.

Thus, the present invention relates to the use of the mixture for combating resistant fungi on agricultural plants, wherein the plant is cucurbits and the resistant fungi is *Pseudoperenospora cubensis*.

Thus, the present invention relates to the use of the mixture for combating resistant fungi on agricultural plants, wherein the plant is cucumber and the resistant fungi is *Sphaerotheca fuliginea*.

Thus, the present invention relates to the use of the mixture for combating resistant fungi on agricultural plants, wherein the plant is potato and the resistant fungi is *Alternaria solani*.

Thus, the present invention relates to the use of the mixture for combating resistant fungi on agricultural plants, wherein the plant is potato and the resistant fungi is *Alternaria alternata*.

Thus, the present invention relates to the use of the mixture for combating resistant fungi on agricultural plants, wherein the plant is eggplant and the resistant fungi is *Mycovellosiealla nattrassil*

Thus, the present invention relates to the use of the mixture for combating resistant fungi on agricultural plants, wherein the plant is asparagus and the resistant fungi is *Stemphylium vestcarium*.

Thus, the present invention relates to the use of the mixture for combating resistant fungi on agricultural plants, wherein the plant is apple and the resistant fungi is *Alternaria alternata*.

Thus, the present invention relates to the use of the mixture for combating resistant fungi on agricultural plants, wherein the plant is apple and the resistant fungi is *Alternaria malus*.

Thus, the present invention relates to the use of the mixture for combating resistant fungi on agricultural plants, wherein the plant is citrus and the resistant fungi is *Alternaria alternata*.

Thus, the present invention relates to the use of the mixture for combating resistant fungi on agricultural plants, wherein the plant is pistachio and the resistant fungi is *Alternaria arborescens*.

Thus, the present invention relates to the use of the mixture for combating resistant fungi on agricultural plants, wherein the plant is pistachio and the resistant fungi is *Alternaria alternata*.

Thus, the present invention relates to the use of the mixture for combating resistant fungi on agricultural plants, wherein the plant is pistachio and the resistant fungi is *Alternaria tenuissima*.

Thus, the present invention relates to the use of the mixture for combating resistant fungi on agricultural plants, wherein the plant is citrus and the resistant fungi is *Botrytis cinerea*.

Thus, the present invention relates to the use of the mixture for combating resistant fungi on agricultural plants, wherein the plant is kiwi and the resistant fungi is *Botrytis cinerea*.

Thus, the present invention relates to the use of the mixture for combating resistant fungi on agricultural plants, wherein the plant is strawberry and the resistant fungi is *Botrytis cinerea*.

Thus, the present invention relates to the use of the mixture for combating resistant fungi on agricultural plants, wherein the plant is strawberry and the resistant fungi is *Colletotrichum gloeosporioides*.

Thus, the present invention relates to the use of the mixture for combating resistant fungi on agricultural plants, wherein the plant is strawberry and the resistant fungi is *Sphaerotheca apharys* var. *aphanis*.

Thus, the present invention relates to the use of the mixture for combating resistant fungi on agricultural plants, wherein the plant is almond and the resistant fungi is *Fusicladium carpophilurn*.

Thus, the present invention relates to the use of the mixture for combating resistant fungi on agricultural plants, wherein the plant is banana and the resistant fungi is *Mycosphaerella fijiensis*.

Thus, the present invention relates to the use of the mixture for combating resistant fungi on agricultural plants, wherein the plant is pears and the resistant fungi is *Stemphylium vesicarium*.

Thus, the present invention relates to the use of the mixture for combating resistant fungi on agricultural plants, wherein the plant is grass and the resistant fungi is *Colletotrichum graminicola*.

Thus, the present invention relates to the use of the mixture for combating resistant fungi on agricultural plants, wherein the plant is grass and the resistant fungi is *Pyricularia grisea*.

Thus, the present invention relates to the use of the mixture for combating resistant fungi on agricultural plants, wherein the plant is fruits and the resistant fungi is *Monilinia taxa*.

Thus, the present invention relates to the use of the mixture for combating resistant fungi on agricultural plants, wherein the plant is fruits and the resistant fungi is *Monilinia fructigena*.

Thus, the present invention relates to the use of the mixture for combating resistant fungi on agricultural plants, wherein the plant is fruits and the resistant fungi is *Monilinia fifiensis*.

The mixtures according to the present invention, respectively, are also suitable for controlling harmful fungi in the protection of stored products or harvest and in the protection of materials.

The term "protection of materials" is to be understood to denote the protection of technical and non-living materials, such as adhesives, glues, wood, paper and paperboard, textiles, leather, paint dispersions, plastics, cooling lubricants, fiber or fabrics, against the infestation and destruction by harmful microorganisms, such as fungi and bacteria. As to the protection of wood and other materials, the particular attention is paid to the following harmful fungi: *Ascomycetes* such as *Ophiostoma* spp., *Ceratocystis* spp., *Aureobasidium pullulans*, *Sclerophoma* spp., *Chaetomium* spp., *Humicola* spp., *Petriella* spp., *Trichurus* spp.; *Basidiomycetes* such as *Coniophora* spp., *Coriolus* spp., *Gloeophyllum* spp., *Lentinus* spp., *Pleurotus* spp., *Poria* spp., *Serpula* spp. and *Tyromyces* spp., *Deuteromycetes* such as *Aspergillus* spp., *Cladosporium* spp., *Penicillium* spp., *Trichoderma* spp., *Alternaria* spp., *Paecilomyces* spp. *and Zygomycetes* such as *Mucor* spp., and in addition in the protection of stored products and harvest the following yeast fungi are worthy of note: *Candida* spp. and *Saccharomyces cerevisae*.

They are particularly important for controlling a multitude of fungi on various cultivated plants, such as bananas, cotton, vegetable species (for example cucumbers, beans and cucurbits), cereals such as wheat, rye, barley, rice, oats; grass coffee, potatoes, corn, fruit species, soya, tomatoes, grapevines, ornamental plants, sugar cane and also on a large number of seeds. In a preferred embodiment, the inventive mixtures are used in soya (soybean), cereals and corn.

In general, "pesticidally effective amount" means the amount of the inventive mixtures or of compositions comprising the mixtures needed to achieve an observable effect on growth, including the effects of necrosis, death, retardation, prevention, and removal, destruction, or otherwise diminishing the occurrence and activity of the target organism. The pesticidally effective amount can vary for the various mixtures/compositions used in the invention. A pesticidally effective amount of the mixtures/compositions will also vary according to the prevailing conditions such as desired pesticidal effect and duration, weather, target species, locus, mode of application, and the like.

As said above, the present invention comprises a method for improving the health of plants, wherein the plant, the locus where the plant is growing or is expected to grow or plant propagation material, from which the plant grows, is treated with an plant health effective amount of an inventive mixture.

The term "plant effective amount" denotes an amount of the inventive mixtures, which is sufficient for achieving plant health effects as defined herein below. More exemplary information about amounts, ways of application and suitable ratios to be used is given below. Anyway, the skilled artisan is well aware of the fact that such an amount can vary in a broad range and is dependent on various factors, e.g. the treated cultivated plant or material and the climatic conditions.

When preparing the mixtures, it is preferred to employ the pure active compounds, to which further active compounds against pests, such as insecticides, herbicides, fungicides or else herbicidal or growth-regulating active compounds or fertilizers can be added as further active components according to need.

The inventive mixtures are employed by treating the fungi or the plants, plant propagation materials (preferably seeds), materials or soil to be protected from fungal attack with a pesticidally effective amount of the active compounds. The application can be carried out both before and after the infection of the materials, plants or plant propagation materials (preferably seeds) by the pests.

In the context of the present invention, the term plant refers to an entire plant, a part of the plant or the propagation material of the plant.

The inventive mixtures and compositions thereof are particularly important in the control of a multitude of phytopathogenic fungi on various cultivated plants, such as cereals, e.g. wheat, rye, barley, triticale, oats or rice; beet, e.g. sugar beet or fodder beet; fruits, such as pomes, stone fruits or soft fruits, e.g. apples, pears, plums, peaches, almonds, cherries, strawberries, raspberries, blackberries or gooseberries; leguminous plants, such as lentils, peas, alfalfa or soybeans; oil plants, such as rape, mustard, olives, sunflowers, coconut, cocoa beans, castor oil plants, oil palms, ground nuts or soybeans; cucurbits, such as squashes, cucumber or melons; fiber plants, such as cotton, flax, hemp or jute; citrus fruit, such as oranges, lemons, grape-fruits or mandarins; vegetables, such as spinach, lettuce, asparagus, cabbages, carrots, onions, tomatoes, potatoes, cucurbits or paprika; lauraceous plants, such as avocados, cinnamon or camphor; energy and raw material plants, such as corn, soybean, rape, sugar cane or oil palm; corn; tobacco; nuts; coffee; tea; bananas; vines (table grapes and grape juice grape vines); hop; turf; sweet leaf (also called *Stevia*); natural rubber plants or ornamental and forestry plants, such as flowers, shrubs, broad-leaved trees or evergreens, e.g. conifers; and on the plant propagation material, such as seeds, and the crop material of these plants.

Preferably, the inventive mixtures and compositions thereof, respectively are used for controlling a multitude of fungi on field crops, such as potatoes, sugar beets, tobacco, wheat, rye, barley, oats, rice, corn, cotton, soybeans, rape, legumes, sunflowers, coffee or sugar cane; fruits; vines; ornamentals; or vegetables, such as cucumbers, tomatoes, beans or squashes.

Preferably, treatment of plant propagation materials with the inventive mixtures and compositions thereof, respectively, is used for controlling a multitude of fungi on cereals, such as wheat, rye, barley and oats; potatoes, tomatoes, vines, rice, corn, cotton and soybeans.

Most preferably are use of the inventive mixtures for the combinations 1-1 to 1-20 as disclosed in Table 1:

| Use | Component 1 | Component 2 | Crop | Pathogen |
|---|---|---|---|---|
| 1-1 | compound I | compound II | wheat | *Erysiphe graminis tritici* |
| 1-2 | compound I | compound II | wheat | *Pyrenophora triticirepentis* |
| 1-3 | compound I | compound II | wheat | *Fusarium graminearum* |

-continued

| Use | Component 1 | Component 2 | Crop | Pathogen |
|---|---|---|---|---|
| 1-4 | compound I | compound II | wheat | *Zymoseptoria tritici* |
| 1-5 | compound I | compound II | wheat | *Puccinia graminis tritici* |
| 1-6 | compound I | compound II | wheat | *Puccinia triticina* |
| 1-7 | compound I | compound II | wheat | *Puccinia striiformis* |
| 1-8 | compound I | compound II | wheat | *Rhynchosporium secalis* |
| 1-9 | compound I | compound II | wheat | *Rhizoctonia cerealis* |
| 1-10 | compound I | compound II | wheat | *Puccinia recondita* |
| 1-11 | compound I | compound II | barley | *Erysiphe graminis* |
| 1-12 | compound I | compound II | barley | *Drechslera teres* |
| 1-13 | compound I | compound II | barley | *Mycosphaerella graminicola* |
| 1-14 | compound I | compound II | barley | *Puccinia triticina* |
| 1-15 | compound I | compound II | barley | *Puccinia striiformis* |
| 1-16 | compound I | compound II | barley | *Rhynchosporium secalis* |
| 1-17 | compound I | compound II | barley | *Rhizoctonia cerealis* |
| 1-18 | compound I | compound II | barley | *Puccinia recondita* |
| 1-19 | compound I | compound II | maize | *Bipolaris zeicola* |
| 1-20 | compound | compound II | maize | *Cercospora zeaemaydis* |
| 1-21 | compound I | compound II | maize | *Phaeosphaeria maydis* |
| 1-22 | compound I | compound II | maize | *Puccinia polysora* |

The term "cultivated plants" is to be understood as including plants which have been modified by breeding, mutagenesis or genetic engineering including but not limiting to agricultural bio-tech products on the market or in development. Genetically modified plants are plants, which genetic material has been so modified by the use of recombinant DNA techniques that under natural circumstances cannot readily be obtained by cross breeding, mutations or natural recombination. Typically, one or more genes have been integrated into the genetic material of a genetically modified plant in order to improve certain properties of the plant. Such genetic modifications also include but are not limited to targeted post-translational modification of protein(s), oligo- or polypeptides e.g. by glycosylation or polymer additions such as prenylated, acetylated or farnesylated moieties or PEG moieties.

Plants that have been modified by breeding, mutagenesis or genetic engineering, e.g. have been rendered tolerant to applications of specific classes of herbicides, such as auxin herbicides such as dicamba or 2,4-D; bleacher herbicides such as hydroxylphenylpyruvate dioxygenase (HPPD) inhibitors or phytoene desaturase (PDS) inhibittors; acetolactate synthase (ALS) inhibitors such as sulfonyl ureas or imidazolinones; enolpyruvylshikimate-3-phosphate synthase (EPSPS) inhibitors, such as glyphosate; glutamine synthetase (GS) inhibitors such as glufosinate; protoporphyrinogen-IX oxidase inhibitors; lipid biosynthesis inhibitors such as acetyl CoA carboxylase (ACCase) inhibitors; or oxynil (i.e. bromoxynil or ioxynil) herbicides as a result of conventional methods of breeding or genetic engineering. Furthermore, plants have been made resistant to multiple classes of herbicides through multiple genetic modifications, such as resistance to both glyphosate and glufosinate or to both glyphosate and a herbicide from another class such as ALS inhibitors, HPPD inhibitors, auxin herbicides, or ACCase inhibitors. These herbicide resistance technologies are e.g. described in Pest Management Sci. 61, 2005, 246; 61, 2005, 258; 61, 2005, 277; 61, 2005, 269; 61, 2005, 286; 64, 2008, 326; 64, 2008, 332; Weed Sci. 57, 2009, 108; Austral. J. Agricult. Res. 58, 2007, 708; Science 316, 2007, 1185; and references quoted therein. Several cultivated plants have been rendered tolerant to herbicides by conventional methods of breeding (mutagenesis), e.g. Clearfield® summer rape (Canola, BASF SE, Germany) being tolerant to imidazolinones, e.g. imazamox, or ExpressSun® sunflowers (DuPont, USA) being tolerant to sulfonyl ureas, e.g. tribenuron. Genetic engineering methods have been used to render cultivated plants such as soybean, cotton, corn, beets and rape, tolerant to herbicides such as glyphosate and glufosinate, some of which are commercially available under the trade names RoundupReady® (glyphosate-tolerant, Monsanto, U.S.A.), Cultivance® (imidazolinone tolerant, BASF SE, Germany) and LibertyLink® (glufosinate-tolerant, Bayer CropScience, Germany).

Furthermore, plants are also covered that are by the use of recombinant DNA techniques capable to synthesize one or more insecticidal proteins, especially those known from the bacterial genus *Bacillus*, particularly from *Bacillus thuringiensis*, such as 5-endotoxins, e.g. CryIA(b), CryIA(c), CryIF, CryIF(a2), CryIIA(b), CryIIIA, CryIIIB(b1) or Cry9c; vegetative insecticidal proteins (VIP), e.g. VIP1, VIP2, VIP3 or VIP3A; insecticidal proteins of bacteria colonizing nematodes, e.g. *Photorhabdus* spp. or *Xenorhabdus* spp.; toxins produced by animals, such as scorpion toxins, arachnid toxins, wasp toxins, or other insect-specific neurotoxins; toxins produced by fungi, such *Streptomycetes* toxins, plant lectins, such as pea or barley lectins; agglutinins; proteinase inhibitors, such as trypsin inhibitors, serine protease inhibitors, patatin, cystatin or papain inhibitors; ribosome-inactivating proteins (RIP), such as ricin, maize-RIP, abrin, luffin, saporin or bryodin; steroid metabolism enzymes, such as 3-hydroxysteroid oxidase, ecdysteroid-IDP-glycosyl-transferase, cholesterol oxidases, ecdysone inhibitors or HMG-CoA-reductase; ion channel blockers, such as blockers of sodium or calcium channels; juvenile hormone esterase; diuretic hormone receptors (helicokinin receptors); stilben synthase, bibenzyl synthase, chitinases or glucanases. In the context of the present invention these insecticidal proteins or toxins are to be understood expressly also as pre-toxins, hybrid proteins, truncated or otherwise modified proteins. Hybrid proteins are characterized by a new combination of protein domains, (see, e.g. WO 02/015701). Further examples of such toxins or genetically modified plants capable of synthesizing such toxins are disclosed, e.g., in EP-A 374 753, WO 93/007278, WO 95/34656, EP-A 427 529, EP-A 451 878, WO 03/18810 and WO 03/52073. The methods for producing such genetically modified plants are generally known to the person skilled in the art and are described, e.g. in the publications mentioned above. These insecticidal proteins contained in the genetically modified plants impart to the plants producing these proteins tolerance to harmful pests from all taxonomic groups of athropods, especially to beetles (*Coeloptera*), two-winged insects (*Diptera*), and moths (*Lepidoptera*) and to nematodes (*Nematoda*). Genetically modified plants capable to synthesize one or more insecticidal proteins are, e.g., described in the publications mentioned above, and some of which are commercially available such as YieldGard® (corn cultivars producing the CryIAb toxin), YieldGard® Plus (corn cultivars producing CryIAb and Cry3Bb1 toxins), Starlink® (corn cultivars producing the Cry9c toxin), Herculex® RW (corn cultivars producing Cry34Ab1, Cry35Ab1 and the enzyme Phosphinothricin-N-Acetyltransferase [PAT]); NuCOTN® 33B (cotton cultivars producing the CryIAc toxin), Bollgard® I (cotton cultivars producing the CryIAc toxin), Bollgard® II (cotton cultivars producing CryIAc and Cry2Ab2 toxins); VIPCOT® (cotton cultivars producing a VIP-toxin); New- Lear) (potato cultivars producing the Cry3A toxin); Bt-Xtra®, NatureGard®, KnockOut®, BiteGard®, Protecta®, Bt11 (e.g. Agrisure® CB) and Bt176 from Syngenta Seeds SAS, France, (corn cultivars producing the CryIAb toxin and PAT enzyme), MIR604 from Syngenta Seeds SAS, France (corn cultivars producing a modified version of the Cry3A toxin, c.f. WO 03/018810), MON 863 from Monsanto Europe S.A., Belgium (corn cultivars producing the Cry3Bb1 toxin), IPC 531 from Monsanto Europe S.A., Belgium (cotton cultivars producing a modified version of the CryIAc toxin) and 1507 from Pioneer Overseas Corporation, Belgium (corn cultivars producing the CryIF toxin and PAT enzyme).

Furthermore, plants are also covered that are by the use of recombinant DNA techniques capable to synthesize one or more proteins to increase the resistance or tolerance of those plants to bacterial, viral or fungal pathogens. Examples of such proteins are the so-called "pathogenesis-related proteins" (PR proteins, see, e.g. EP-A 392 225), plant disease resistance genes (e.g. potato cultivars, which express resistance genes acting against *Phytophthora infestans* derived from the mexican wild potato *Solanum bulbocastanum*) or T4-lysozym (e.g. potato cultivars capable of synthesizing these proteins with increased resistance against bacteria such as *Erwinia amylvora*). The methods for producing such genetically modified plants are generally known to the person skilled in the art and are described, e.g. in the publications mentioned above.

Furthermore, plants are also covered that are by the use of recombinant DNA techniques capable to synthesize one or more proteins to increase the productivity (e.g. bio mass production, grain yield, starch content, oil content or protein content), tolerance to drought, salinity or other growth-limiting environmental factors or tolerance to pests and fungal, bacterial or viral pathogens of those plants.

Furthermore, plants are also covered that contain by the use of recombinant DNA techniques a modified amount of substances of content or new substances of content, specifically to improve human or animal nutrition, e.g. oil crops that produce health-promoting long-chain omega-3 fatty acids or unsaturated omega-9 fatty acids (e.g. Nexera® rape, DOW Agro Sciences, Canada).

Furthermore, plants are also covered that contain by the use of recombinant DNA techniques a modified amount of substances of content or new substances of content, specifically to improve raw material production, e.g. potatoes that produce increased amounts of amylopectin (e.g. Amflora® potato, BASF SE, Germany).

The separate or joint application of the compounds of the inventive mixtures is carried out by spraying or dusting the seeds, the seedlings, the plants or the soils before or after sowing of the plants or before or after emergence of the plants.

The inventive mixtures and the compositions comprising them can be used for protecting wooden materials such as trees, board fences, sleepers, etc. and buildings such as houses, outhouses, factories, but also construction materials, furniture, leathers, fibers, vinyl articles, electric wires and cables etc. from ants and/or termites, and for controlling ants and termites from doing harm to crops or human being (e.g. when the pests invade into houses and public facilities).

Customary application rates in the protection of materials are, for example, from 0.01 g to 1000 g of active compound per m 2 treated material, desirably from 0.1 g to 50 g per m$^2$.

For use in spray compositions, the content of the mixture of the active ingredients is from 0.001 to 80 weight %, preferably from 0.01 to 50 weight % and most preferably from 0.01 to 15 weight %.

Microtest

The active compounds were formulated separately as a stock solution having a concentration of 10000 ppm in dimethyl sulfoxide.

EXAMPLE 1—ACTIVITY AGAINST EARLY BLIGHT CAUSED BY *ALTERNARIA SOLANI*

The stock solutions were mixed according to the ratio, pipetted onto a micro titer plate (MTP) and diluted with water to the stated concentrations. A spore suspension of *Alternaria solani* in an aqueous biomalt or yeast-bactopeptone-glycerine or DOB solution was then added. The plates were placed in a water vapor-saturated chamber at a temperature of 18° C. Using an ab-sorption photometer, the MTPs were measured at 405 nm 7 days after the inoculation.

| Active compound/ active mixture | Concentration (ppm) | Mixture | Observed efficacy | Calculated efficacy according to Colby (%) | Synergism (%) |
|---|---|---|---|---|---|
| Compound I | 4 | — | 30 | | |
| | 1 | — | 8 | | |
| | 0.25 | — | 7 | | |
| Compound II | 0.016 | — | 11 | | |
| Compound I | 4 | 250:1 | 71 | 38 | 33 |
| Compound II | 0.016 | | | | |

The measured parameters were compared to the growth of the active compound-free control variant (100%) and the fungus-free and active compound-free blank value to determine the relative growth in % of the pathogens in the respective active compounds.

These percentages were converted into efficacies.

An efficacy of 0 means that the growth level of the pathogens corresponds to that of the un-treated control; an efficacy of 100 means that the pathogens were not growing.

The expected efficacies of active compound mixtures were determined using Colby's formula [R. S. Colby, "Calculating synergistic and antagonistic responses of herbicide combinations", Weeds 15, 20-22 (1967)] and compared with the observed efficacies.

The invention claimed is:

1. A fungicidal mixture comprising, as active components,
    1) 4-[[6-[2-(2,4-difluorophenyl)-1,1-difluoro-2-hydroxy-3-(5-sulfanyl-1,2,4-triazol-1-yl)propyl]-3-pyridyl]oxy]benzonitrile as compound I and 2) 1-[2-[[1-(4-chlorophenyl)pyrazol-3-yl]oxymethyl]-3-methyl-phenyl]-4-methyl-tetrazol-5-one as compound II.

2. The mixture as claimed in claim 1, wherein ratio by weight of compound I and compound II is from 100:1 to 1:100.

3. A pesticidal composition, comprising a liquid or solid carrier and a mixture as defined in any of claim 1.

4. A method for controlling phytopathogenic pests, wherein the pest, their habitat, breeding grounds, their locus or the plants to be protected against pest attack, the soil or plant propagation material are treated with an effective amount of the mixture as defined in claim 1.

5. The method as defined in claim 4 for controlling phytopathogenic harmful fungi on cereals.

6. The method as defined in claim 4 for controlling phytopathogenic harmful fungi on corn.

7. The method as defined in claim 4 for controlling phytopathogenic harmful fungi wherein the fungi contains a mutation in the mitochondrial cytochrome b gene conferring resistance to $Q_o$ inhibitors, wherein the mutation is G143A or F129L.

8. The method as defined in claim 4 against
Blumeria (formerly Erysiphe) graminis on cereals;
Drechslera (syn. Helminthosporium) spp. on cereals;
Fusarium spp.;
Mycosphaerella spp. on cereals;
Puccinia spp. (rusts) on cereals;
Rhynchosporium secalis and R. commune (scald) on cereals;
Septoria spp. on cereals.

9. The method as defined in claim 4 against
Bipolaris and Drechslera spp.;
Cercospora spp. on corn;
Phaeosphaeria maydis and Puccinia polysora on corn.

10. The method as defined in claim 4 against Cercospora spp. sugar beets.

11. The method as claimed in claim 4, wherein the mixture is applied in an amount of from 0.01 g to 10 kg per 100 kg of plant propagation materials.

12. A method for controlling phytopathogenic pests, wherein the pests, their habitat, breeding grounds, their locus or the plants to be protected against pest attack, the soil or plant propagation material are treated with an effective amount of
1) 4-[[6-[2-(2,4-difluorophenyl)-1,1-difluoro-2-hydroxy-3-(5-sulfanyl-1,2,4-triazol-1-yl)propyl]-3-pyridyl]oxy]benzonitrile as compound I and
2) 1-[2-[[1-(4-chlorophenyl)pyrazol-3-yl]oxymethyl]-3-methyl-phenyl]-4-methyl-tetrazol-5-one as compound II,
wherein compound I and compound II are applied as a mixture of compound I and compound II, compound I and compound II are applied separately and simultaneously, or compound I and compound II are applied separately in succession.

* * * * *

UNITED STATES PATENT AND TRADEMARK OFFICE
CERTIFICATE OF CORRECTION

PATENT NO. : 11,998,010 B2  
APPLICATION NO. : 17/251838  
DATED : June 4, 2024  
INVENTOR(S) : Christian Harald Winter et al.

Page 1 of 1

It is certified that error appears in the above-identified patent and that said Letters Patent is hereby corrected as shown below:

On the Title Page

At item (57), Line 2, "4-[[6-(2,4-difluorophenyl)-1," should be -- 4-[[6-[2-(2,4-difluorophenyl)-1, --.

At item (57), Lines 4-5, "1-2-[[1-(4-chlorophenyflpyrazol-3-yl]oxymethyl]-3-methyl-" should be -- 1-[2-[[1-(4-chlorophenyl)pyrazol-3-yl]oxymethyl]-3-methyl- --.

Signed and Sealed this  
Tenth Day of December, 2024

Katherine Kelly Vidal  
*Director of the United States Patent and Trademark Office*